United States Patent [19]

Glasgow et al.

[11] Patent Number: 4,524,190
[45] Date of Patent: Jun. 18, 1985

[54] PROCESS FOR PREPARATION OF CROSS-LINKED POLY(TRI-N-BUTYLTIN)METHACRYLATE WITH SIMULTANEOUS PARTICLE SIZE REDUCTION

[75] Inventors: D. Gerald Glasgow, Centerville; Joseph Satanek, Xenia, both of Ohio

[73] Assignee: The United States of America as represented by the Secretary of the Navy, Washington, D.C.

[21] Appl. No.: 609,940

[22] Filed: May 14, 1984

[51] Int. Cl.³ ............................................. C08F 8/44
[52] U.S. Cl. .................................... 525/370; 525/330.2
[58] Field of Search ............................ 525/370, 330.2

[56] References Cited

U.S. PATENT DOCUMENTS

| | | | |
|---|---|---|---|
| 3,979,354 | 9/1976 | Dyckman | 525/404 |
| 4,058,544 | 11/1977 | Kushlefsky | 260/429.7 |
| 4,064,338 | 12/1977 | Russell | 526/230 |
| 4,075,319 | 2/1978 | Dyckman et al. | 525/370 |
| 4,104,234 | 8/1978 | Bednarski et al. | 524/547 |
| 4,157,999 | 6/1979 | Matsuda et al. | 524/547 |
| 4,187,211 | 2/1980 | Robinson et al. | 524/197 |

Primary Examiner—Joseph L. Schofer
Assistant Examiner—Bernard Lipman
Attorney, Agent, or Firm—Robert F. Beers; Henry Hansen; Vincent T. Pace

[57] ABSTRACT

Poly(tri-n-butyltin) methacrylate, an anti-fouling compound, is prepared by esterifying a cross-linked polymethacrylic acid with tributyltin oxide in the presence of a poly solvent. The poly solvent, such as acetone, dioxane or methyl-ethyl ketone, causes particle size reduction due to hydraulic shattering. The in-reaction particle size reduction eliminates the need for mechanical post grinding in the current process.

5 Claims, 1 Drawing Figure

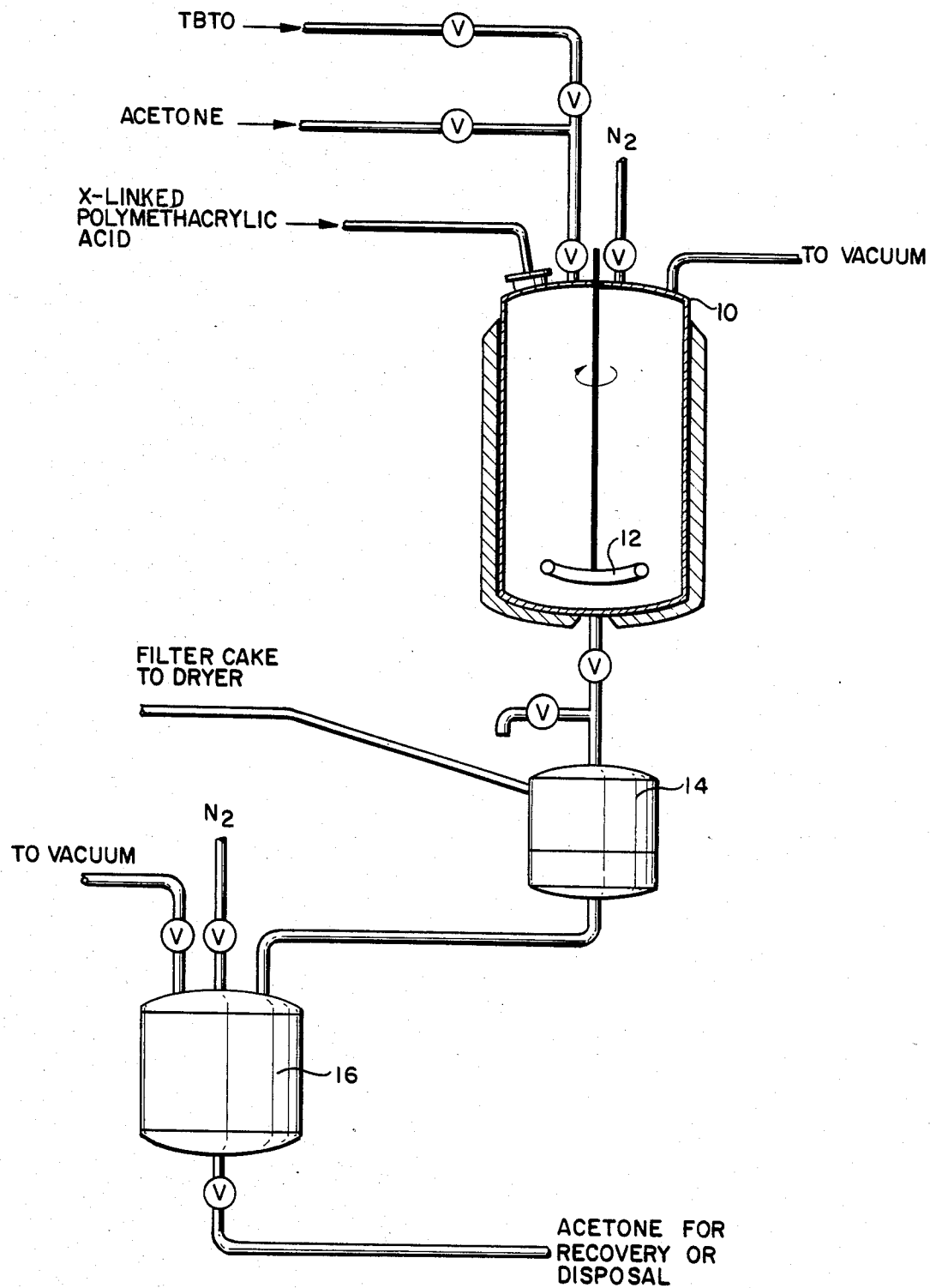

PROCESS FOR PREPARATION OF CROSS-LINKED POLY(TRI-N-BUTYLTIN)METHACRYLATE WITH SIMULTANEOUS PARTICLE SIZE REDUCTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to preparation of anti-fouling compounds, and more particularly to an improved method for batch production of crosslinked poly(tri-n-butyltin)methacrylate.

Crosslinked poly(tri-n-butyltin)methacrylate, an organometallic polymer, hereafter referred to as OMP-5, is used as an anti-fouling agent to prevent the growth of marine organisms on the hulls of ships. The current process for preparing OMP-5 calls for esterification of crosslinked polymethacrylic acid with tributyltin oxide (TBTO) in the presence of toluene. The toluene permits azeotropic distillation of water in an effort to drive the esterification reaction between the crosslinked polymethacrylic acid and the TBTO. The resultant product has an enlarged particle size which must be mechanically ground down to a size which is more useful as a pigment in antifouling coatings. Generally, the grinding step is performed after the esterification, however, the order may sometimes be reversed.

In either case, the mechanical grinding step and the associated handling constitute a significant portion of the cost of producing OMP-5. Also, substantial material losses are often incurred in the grinding operation. Furthermore, the grinding operation generates respirable dusts which could be hazardous to the health of personnel exposed thereto.

SUMMARY OF THE INVENTION

Accordingly, it is an object of this invention to produce OMP-5 in a particle size small enough to be useful as a pigment in a coating.

It is a further object of this invention to produce OMP-5 in a useful particle size without the need for grinding.

The above and other objects are realized in a process which esterifies tributyltin oxide with crosslinked polymethacrylic acid in the presence of a polar solvent such as acetone. The end product has a particle size which is sufficiently small for use as a pigment without grinding.

Other objects, advantages, and novel features of the invention will become apparent from the detailed description which follows the accompanying drawing wherein:

BRIEF DESCRIPTION OF THE DRAWING

The FIGURE shows a schematic representation of a system for producing OMP-5 by the process according to the invention.

DETAILED DESCRIPTION OF THE INVENTION

Referring now to the drawing there is shown generally a system for production of OMP-5 by a process according to the present invention. In the preferred technique of practicing the present invention the equipment is cleaned and dried, a vacuum is drawn on a glass-lined steel reactor 10, and a solvent such as acetone is drawn into reactor 10. The vacuum is then relieved with nitrogen and crosslinked polymethacrylic acid (e.g., Rohm and Haas' Amberlite IRC 50) is added. As the polymethacrylic acid is introduced agitation is applied to the mixture by means of an agitator or stirrer 12.

When the introduction of polymethacrylic acid is complete a vacuum is again drawn on reactor 10 and tributyltin oxide (TBTO) is then drawn into reactor 10. The vacuum is again relieved with nitrogen and a very slight nitrogen purge is maintained while the reactor 10 and contents are heated to reflux. The actual reaction temperature will depend on such parameters as type and quantity of the materials used, etc.

The esterification reaction is continued for a sufficient period of time to produce the desired quantity of OMP-5. The reactor 10 and contents are then cooled. The OMP-5 solids are drawn into a filter 14 made of a suitable material such as stainless steel. The filtrate from filter 14 is retained in a vacuum filtration receiver 16 for disposal or recovery.

Reactor 10 is then filled with acetone and the OMP-5 filtered product. The mixture is stirred by stirrer 12. The solids are then isolated and slurried with acetone again. The acetone washes are retained for recovery or disposal in receiver 16. The filtered product is then vacuum dried. The particle size of the OMP-5 end product is generally less than 45 $\mu$m. For comparison, the particle size of OMP-5 prepared by the standard process using toluene is generally in the range of 300 to 500 $\mu$m before grinding.

The reaction has also been run with dioxane and methyl ethyl ketone (MEK) and significant particle size reduction was realized. The most significant reduction was obtained using dioxane. Table I shows a comparison of the use of various solvents in the process as well as the influence of certain reaction variables.

TABLE I

INFLUENCE OF REACTION VARIABLES ON OMP 5 PREPARATION IN VARIOUS SOLVENTS

| IRC 50 Percent $H_2O$ | Reaction Parameters | | | OMP 5 | | |
|---|---|---|---|---|---|---|
| | TBTO/acid[1] | Percent solids[2] | Solvent | Percent yield[3] | Percent Sn[4] | Particle size, um[5] |
| 11.2 | 1.18 | 18 | Toluene | 70 | 25.2 | 300–500 |
| 52. | 1.06 | 18 | Toluene | 80 | 28.1 | 300–500 |
| 52. | 1.06 | 40 | Toluene | 80 | | 300–500 |
| 1.4 | 1.12 | 37 | Dioxane | 75[6] | 28.1 | 100%<45 |
| 4. | 1.14 | 18 | Dioxane | 70[6] | 28.4 | 100%<45 |
| 52. | 1.06 | 18 | Dioxane | 76[6] | | 15%<45 |
| <0.5 | 1.08 | 33 | Acetone | | | 60%<45 |
| 1.4 | 1.12 | 18 | Acetone | 88 | | 95%<45 |
| 52. | 1.06 | 18 | Acetone | 88 | | 50%<45 |

TABLE I-continued

INFLUENCE OF REACTION VARIABLES ON OMP 5 PREPARATION IN VARIOUS SOLVENTS

| IRC 50 | Reaction Parameters | | | OMP 5 | | |
|---|---|---|---|---|---|---|
| Percent $H_2O$ | TBTO/ acid[1] | Percent solids[2] | Solvent | Percent yield[3] | Percent Sn[4] | Particle size, um[5] |
| 52. | 1.06 | 60 | Acetone | | | 300–500 |
| 1.2 | 1.16 | 18 | MEK | | | 80%<45 |
| 1.3 | 0.73 | 17 | acetonitrile | 96 | | 29%<45 |
| 1.3 | 0.73 | 17 | tetrahydrofuran | 92 | | 33%<45 |
| 1.3 | 0.73 | 17 | n-butyl alcohol | 90 | | 33%<45 |
| 1.3 | 0.73 | 17 | 1,2-dimethoxyethane | 90 | | 38%<45 |

[1]Molar ratio of $Bu_3Sn$ moiety to acid moiety.
[2]IRC-50 plus TBTO/total reaction volume.
[3]Assuming 100% conversion of acid to tributyltin ester.
[4]Values adjusted based on percent recovery of Sn in NBS standard.
[5]As measured by microscopic analysis of approximately 200 particles.
[6]Values a minimum due to loss of fines during filtration.

Three variables appear to have an influence on particle size and tin level desired: (1) the initial water content of the polymethacrylic acid, (2) the TBTO/acid ratio, and (3) the solids content of the reaction mixture. The preparations listed in Table I were all performed in the same manner using identical lots of starting materials.

Particle size reduction in the preparation of OMP-5 by the process according to the present invention is believed to be caused by hydraulic shattering. Hydraulic shattering of crosslinked polymers is thought to occur when a sufficiently crosslinked polymer is exposed to a solvent that causes extensive swelling of a lightly crosslinked polymer or that dissolves an uncrosslinked polymer. Under these conditions the solubility parameter of the polymer and solvent are equal or very nearly equal. This implies a fairly complex situation for shattering of OMP-5 during its preparation.

It has been determined that acetone, MEK, and dioxane do not cause shattering of either the crosslinked polymethacrylic acid or the OMP-5 end product. Therefore, the shattering must occur at some intermediate stage of the esterification process. During the conversion of the crosslinked polymethacrylic acid to OMP-5 the solubility parameter of the polymer decreases.

The solvent system present during the reaction consists of three components: solvent, water and TBTO. The amount of TBTO decreases and the amount of water increases during the reaction. The net result is that the solubility parameter of the solvent increases during the reaction. Therefore, shattering must occur at that stage of the reaction when the degree of conversion to OMP-5 brings the solubility parameter of the polymer to the same level as that of the solvent at that particular stage of conversion.

Thus, a three-factor interaction is present with the three-component solvent system described above. The optimum conditions for shattering can be determined empirically with very little difficulty.

Some of the many advantages and new features of the subject invention should now be apparent in view of the foregoing description. A process for the preparation of crosslinked poly(tri-n-butyltin) methacrylate (OMP-5), an antifouling compound, has been described which eliminates the necessity of grinding the end product in order to obtain a particle size which is useful as a pigment in a coating.

Numerous modifications and variations of the subject invention are possible in light of the above teachings. It is therefore to be understood that within the scope of the appended claims, the invention may be practiced otherwise than as specifically described herein.

What is claimed is:

1. A process for the simultaneous preparation and particle size reduction of poly(tri-n-butyltin) methacrylate comprising the steps of:
   combining a cross-linked polymethacrylic acid, tributyl tin oxide, and a poly solvent capable of causing hydraulic shattering of crosslinked polymers; and
   esterifying said combined elements until a desired quantity of poly(tri-n-butyltin) methacrylate product is obtained.

2. A process as recited in claim 1 wherein the poly solvent is selected from the group consisting of acetone, dioxane, methyl-ethyl-ketone (MEK), acetonitrile, tetrahydrofuran, n-butyl alcohol, and 1, 2-dimethoxyethane.

3. A process as recited in claim 2 further comprising the step of drying the poly(tri-n-butyltin) methacrylate product under vacuum.

4. A process for the simultaneous preparation and particle size reduction of poly(tri-n-butyltin) methacrylate comprising the steps of:
   drawing a vacuum on a reaction chamber;
   introducing a poly solvent capable of causing hydraulic shattering of crosslinked polymers into said reaction chamber;
   introducing a crosslinked polymethacrylic acid into said reaction chamber with agitation;
   introducing tributyltin oxide into said reaction chamber;
   relieving the chamber vacuum with a nitrogen purge;
   heating the reaction chamber to the critical reaction tem perature; and
   continuing the reaction until a desired quantity of poly(tri-n-butyltin) methacrylate is produced.

5. A process as recited in claim 4 further comprising the steps of:
   filtering the poly(tri-n-butyltin) methacrylate product to remove residual liquids;
   slurrying the filtered product with a suitable solvent;
   refiltering the slurried product; and
   vacuum drying the refiltered product;
   whereby poly(tri-n-butyltin) methacrylate having a particle size sufficiently small for immediate use as a pigment in an anti-fouling coating is produced.

* * * * *